Dec. 12, 1972 P. G. DIMO ET AL 3,706,073
GRAPHIC DISPLAY APPARATUS FOR DIRECT ANALYSIS
OF ELECTRIC POWER SYSTEMS
Filed March 27, 1970 6 Sheets-Sheet 1

INVENTORS:
Paul Gheorghe Dimo
Dimitrie Petre Dimo

BY *Spencer & Kaye*

ATTORNEYS

INVENTORS:
Paul Gheorghe Dimo
Dimitrie Petre Dimo

BY Spencer & Kaye
ATTORNEYS.

FIG. 8

INVENTORS:
Paul Gheorghe Dimo
Dimitrie Petrie Dimo

FIG. 10

INVENTORS
Paul Gheorghe Dimo
Dimitrie Petre Dimo

BY Spencer & Kaye
ATTORNEYS.

FIG. 11

United States Patent Office 3,706,073
Patented Dec. 12, 1972

3,706,073
GRAPHIC DISPLAY APPARATUS FOR DIRECT ANALYSIS OF ELECTRIC POWER SYSTEMS
Paul G. Dimo and Dimitrie P. Dimo, Bucharest, Rumania, assignors to Ministerul Energiei Electrice, Bucharest, Rumania
Continuation-in-part of application Ser. No. 590,780, Oct. 31, 1966. This application Mar. 27, 1970, Ser. No. 23,284
Claims priority, application Rumania, Nov. 12, 1965, 50,537
Int. Cl. G06f 3/14
U.S. Cl. 340—172.5                                        5 Claims

ABSTRACT OF THE DISCLOSURE

The operation of an electrical power system is visually analysed by means of "nodal images" displayed on the screen of a cathode ray tube. Nodal images are a graphical representation of the vectorial sum of short-circuit current vectors, in the central node of a standard, equivalent network, named REI. The components of the REI network and of the corresponding "nodal images," are computed in a digital computer. The necessary computed values are transferred from computer's memory to the proposed apparatus, which is a specialized peripheral equipment to the above-mentioned computer and consists of buffer memory, registers, counters, comparators, digital to analog converters, integrators, gates, displaying device and means for establishing a man-computer dialog. This apparatus takes in charge the conversion of the computed values from digital to analog form and the display of the nodal image, as well as the accounting of operator's requests.

CROSS-REFERENCE TO A RELATED APPLICATION

This application is a continuation-in-part of co-pending application Ser. No. 590,780, filed Oct. 31, 1966, now abandoned.

BACKGROUND OF THE INVENTION

This invention relates to an automatic apparatus to perform a generalized survey of the physical phenomena in an electrical power system.

The invention is an improvement of the "graphic analyser" disclosed in U.S. Pat. No. 3,116,558, issued to applicant Paul Gheorghe Dimo on Jan. 7, 1964. That patent discloses a method for plotting graphs by means of mechanical, non-automatic apparatus.

There has also been developed a general theory of using digital computation to reduce any complex network to a simple radial, equivalent and independent standard network, known as a "REI network." Such theory is described in "Revue Generale de l'Electricite" No. 1/1967, page 85, and "Rapport CIGRE 318," Paris, 1964.

This reduced network is the same as the radial network used for graphical analysis with the device described in U.S. Pat. No. 3,116,558, particularly with regard to FIG. 1b thereof.

To obtain the reduced REI network, one uses the matrix nodal equations of the given complex network. These equations are processed by a computer so that only the node under study and the nodes considered as power generators are kept in the reduced network. The one-to-one correspondence between the processed equations and an electrical network is finally used to establish the REI network in the manner set out in the "Revue Generale de l'Electricite," 1/1967, page 85.

Given the appropriate REI network, one can compute the components of the short-circuit currents in its central node. In this manner, the chain of vectors which describe the state of the node can be obtained, and this chain is called the "nodal image."

The nodal image described above is used for the analysis of steady state operation. Analysis of dynamic operation may be made from "dynamic nodal images."

SUMMARY OF THE INVENTION

An object of this invention is to automatically obtain graphical displays of both static and dynamic nodal images.

Apparatus is provided herein to be attached to a digital computer in order that the above mentioned object may be carried out. The apparatus consists of known digital and analog devices, interconnected in such a manner as to automatically obtain the desired nodal images. This apparatus may be housed in a specially designed console. The console will advantageously include a functional keyboard and a typewriter, along with a permanent recording device. The permanent recording device is advantageously a photographic apparatus.

The behavior of the various important real nodes of the system, as well as that of fictitious nodes such as the "single load node" described in Rev. Roumaine des Sciences Techniques-Electrotechnique et Energetique, No. 2/1964, are of interest in system analysis or in power dispatching. The apparatus according to the invention supplies the desired information in the most efficient manner: that is, by directly displaying the nodal images. Additional information regarding the precise values of the impedances in the REI network, the nodal voltages, the injected currents, and other parameters of great importance in the analysis of a power system, may be automatically recorded at a typewriter associated with the proposed apparatus, as well as on the computer's typewriter or printer. The operator can make notes on pre-printed graphs of the REI networks, according to the nodal images he wishes to obtain.

A permanent record of the nodal images may also be useful for later studies. Such a permanent record can be obtained by using a photographic apparatus to record the displays on the display system according to the invention. It is of special advantage to provide this feature when the entire analyzing system operates in real-time.

It may be of interest to adopt a special purpose displaying device, as proposed herein, to the computers which generally are controlling the operation of big power generator groups, for example greater than 200 mw. This will offer to the operator an intuitive real-time representation of the generator's behaviour in the mode in which it is connected.

BRIEF DESCRIPTION OF THE DRAWINGS

FIG. 11 is a flow-chart illustrating the operation of the visualizing system of FIG. 2.

DESCRIPTION OF THE PREFERRED EMBODIMENT

Figure 1:
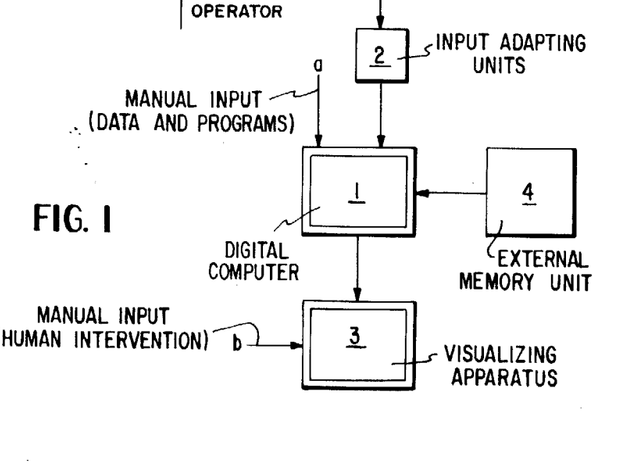
FIG. 1 is a general block diagram of apparatus employing a system according to the present invention.

Referring to FIG. 1, the general organization of an installation containing the visualizing or, display apparatus according to the invention is shown.

Block 1 represents a digital computer which can work either on-line or off-line with respect to an electric power system.

Block 2 represents the adapting units necessary if the computer is to work on-line. These adapting units connect the computer to the communication channels used for digital data transmission.

Block 3 represents the graphical display apparatus according to the present invention.

Block 4 represents an external memory unit. This unit stores the general programs used in computations required for an analysis of a power system.

The manual input indicated as $a$ and $b$ are off-line data and programs introduction and human intervention inputs respectively.

Figure 2:
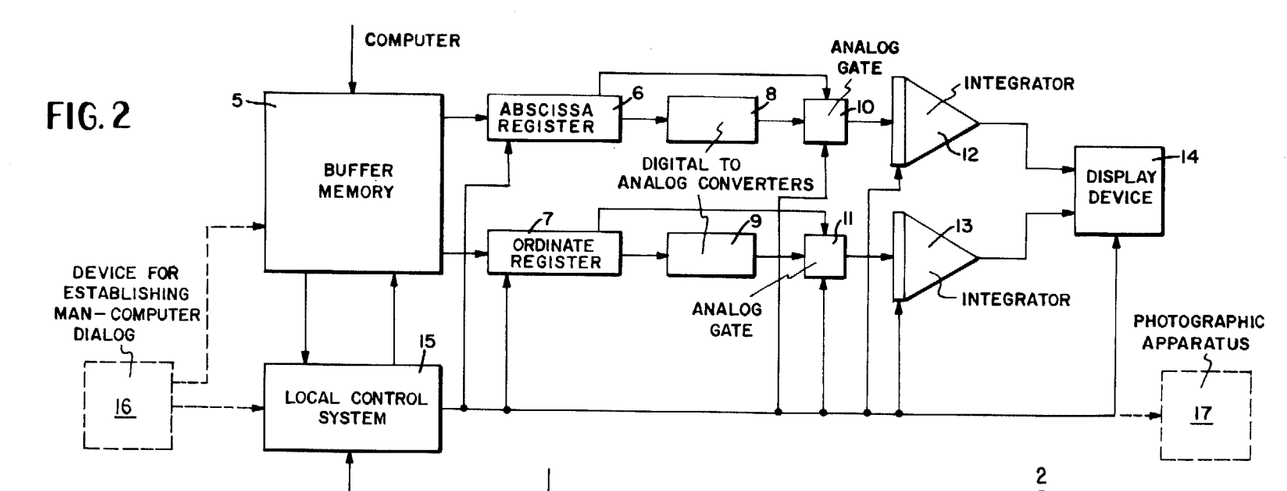
FIG. 2 is a detailed block diagram of one embodiment of a system according to the invention.
Figure 2:
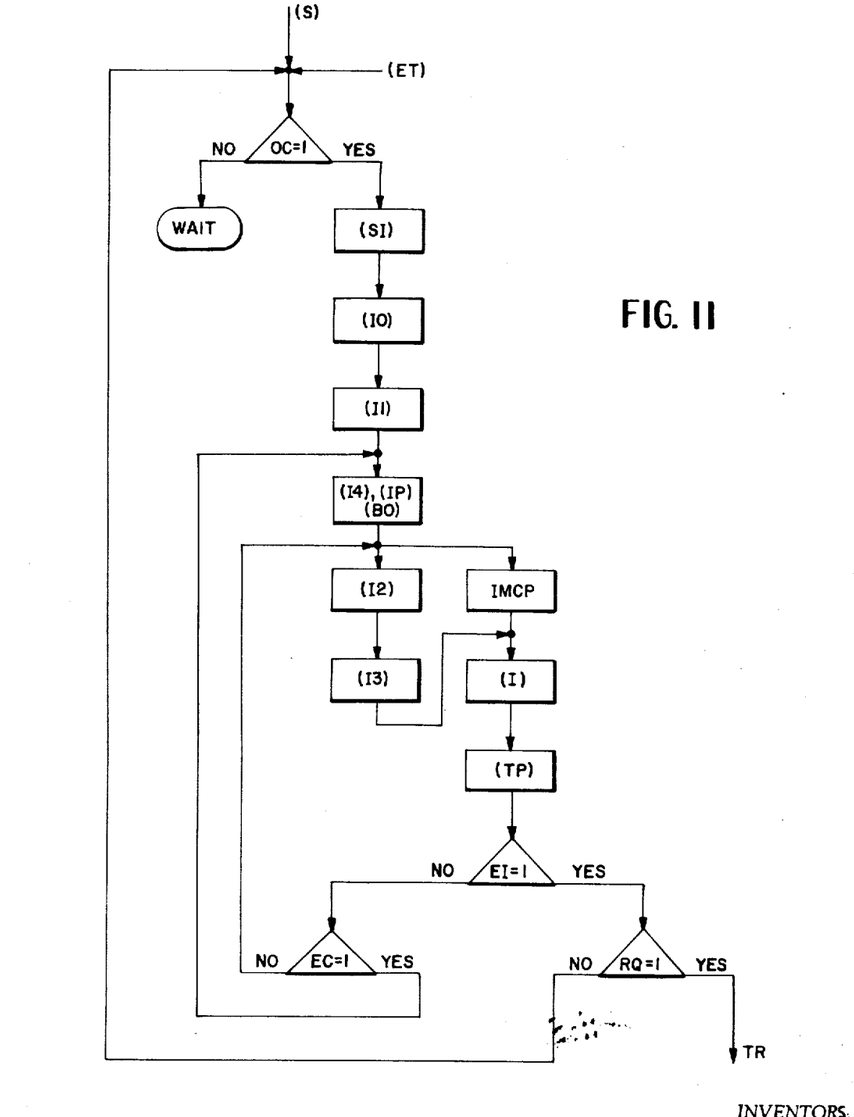

FIG. 2 illustrates a visualizing system 3 according to the present invention. This system serves to produce the automatic display of nodal images. It operates under the control of its own control unit and has its own buffer memory 5. It may also be provided with means to establish a man-computer dialogue through the same buffer memory 5 by means of, for example, a typewriter and special function keys. The latter apparatus is of a well known type and is indicated in FIG. 2 by the block numbered 16.

The system of FIG. 2 operates as follows:

The computed values of the abscissa and the ordinate for all of the vectors present in the nodal image are stored in direct binary code in successive cells of buffer memory 5. A sign bit is associated with each of the stored values. The buffer memory 5 can be of a type well known in the art.

The coordinates of each vector to be displayed are automatically transferred, together with their associated sign bits, from the buffer memory to the registers 6 and 7. The registers 6 and 7 are called the "abscissa register" and "ordinate register" respectively.

The digital values transferred to the abscissa and ordinate registers are converted into direct analog voltage form in the digital-to-analog converters 8 and 9. The voltages obtained from the digital-to-analog converters 8 and 9 are sent, along with the appropriate sign, through the analog gates 10 and 11 to the integrators 12 and 13 for a fixed period of time. The digital-to-analog converters 8 and 9, the analog gates 10 and 11, and the integrators 12 and 13 are all well known in the art.

Voltages which vary as a linear function of time are thus obtained at the output of the integrators 12 and 13. These voltages are applied to a display device 14, which is preferably a cathode-ray beam oscilloscope. It could also be an x-y plotter. If the display device 14 is an oscilloscope, the voltages are applied so as to deflect the cathode-ray beam along the $x$ and $y$ axes of the cathode-ray tube. In this manner, a straight line is drawn, the slope of which equals the ratio of the digital values present in the ordinate and abscissa registers.

In order to obtain the chain of vectors, which vectors have different lengths in accordance with the nodal image to be drawn, the values of the coordinates of one vector stored in registers 6 and 7 have to be replaced, in fixed time intervals, by the values of the coordinates of the next vector in the chain. Thus the slope of the displayed straight line is modified in accordance with the next vector to be displayed. The fixed time intervals are established automatically or at the operators choice through a local control system 15. This control system 15 also supervises the operation of the entire system.

Figure 4:
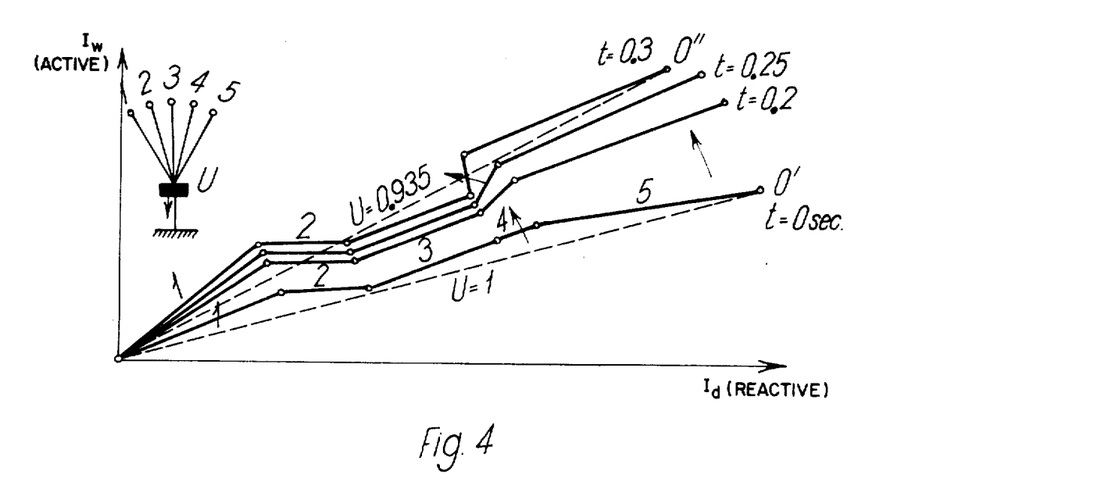
FIG. 4 is a graph showing a "dynamic nodal image" belonging to a 5-generator system.

In order to obtain the "dynamic nodal image" illustrated in FIG. 4, sufficient capacity must be provided in the buffer memory to store the coordinates of all of the vectors to be drawn. The successive chains will be drawn one after another. When a chain has been drawn in the manner described above, the integrators are returned to their initial states through initializing circuits under the control of the control system 15 and the system starts drawing the next vector chain. When initializing the integrators, a synchronous command must be applied to the display device 14 in order to blank the light-spot on the screen.

The operation of the visualizing system has to be cyclic in order to obtain a stable image. The cyclic mode of operation is also controlled by the local control system 15.

Means for recording the displayed image photographically, of special interest when working in real-time, can be provided by an electronically controlled photographic apparatus 17. Such apparatus is well known in the art. The lens of such a device may simply be directed at the screen and its shutter triggered.

Figures 6, 7:
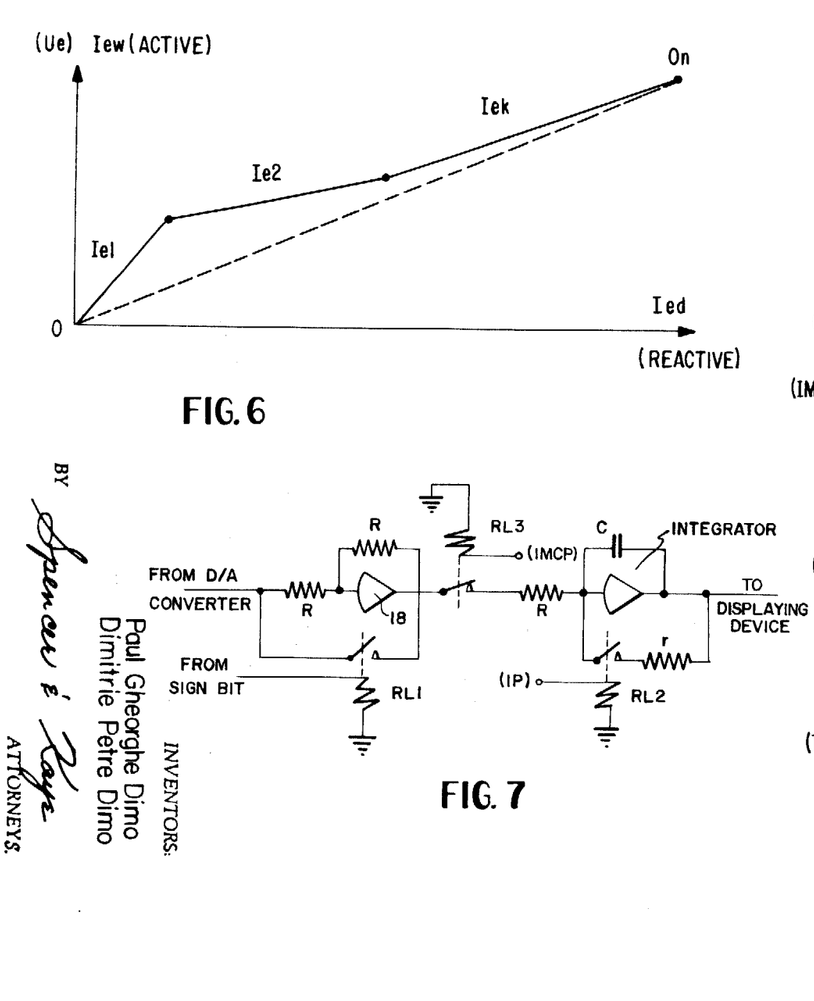
FIG. 6 is a graph showing a "nodal image" of the pseudo-node of the single load for the system in FIG. 5.
FIG. 7 is a schematic diagram of a portion of the system of FIG. 2.

In FIG. 7 additional details are given about the analog gates and resetting circuits. They are presented as using fast electromechanical relays RL1 and RL2, but various known electronic switches can be designed to meet the same requirements. Two identical circuits must be present: the first for the abscissa, and the second for the ordinate. The circuit of FIG. 7 operates as follows:

The analog voltage obtained at the output of one of the D/A converters 8 and 9 is applied directly to one of the integrators 12 and 13 when the contact of relay RL1 is closed; or it is passed through a sign inverting operational amplifier 18 when the contact of relay RL1 is open. The opened or closed condition of relay RL1 is in accordance with the sign bit of the corresponding digital value.

When a resetting, or initializing, pulse (IP) occurs, it must set the output voltage of the integrator to zero. Therefore, it closes the contact of relay RL2 for a short time and, thus, the electrical charge accumulated by capacitor C during the previous integration will be discharged through resistor $r$.

So that uncontrolled voltage variations at the input of the integrators may be avoided during changes occurring in the abscissa and ordinate registers, a reference condition pulse IMCP is sent from the local control unit 15 to open the contact of relay RL3 and, thus, open the integrator's input voltage circuit.

Figure 8:
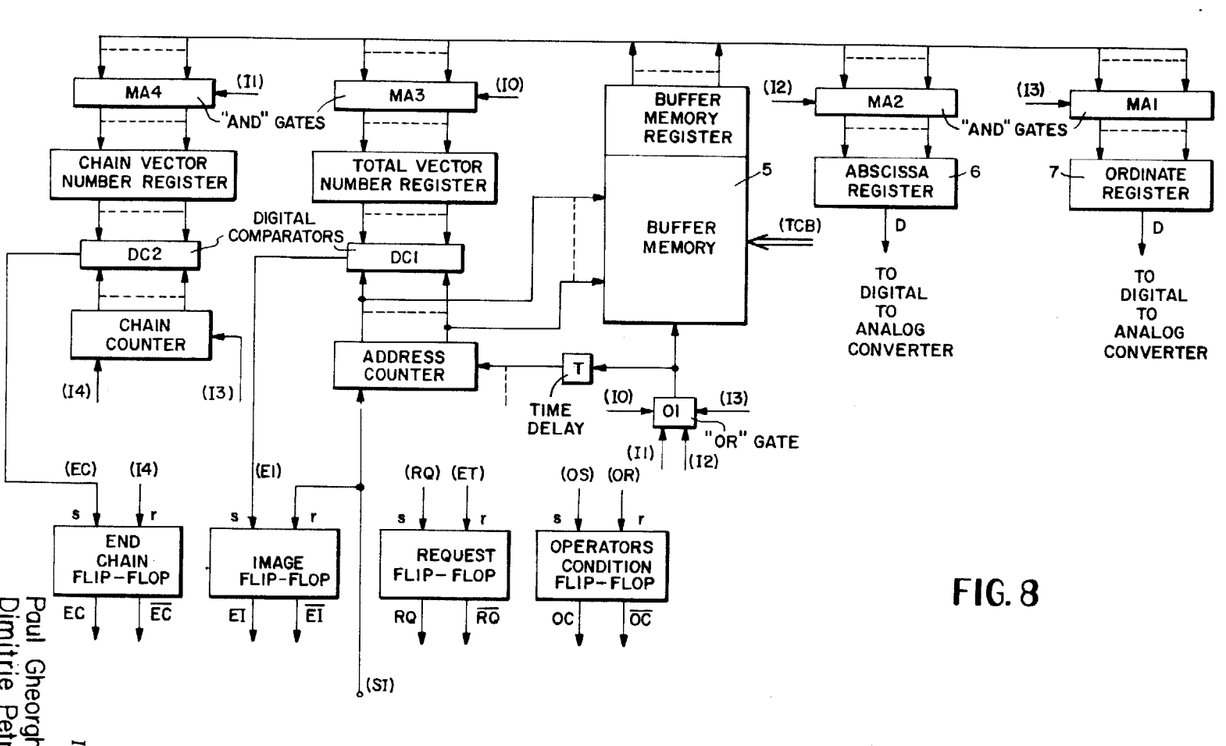
FIG. 8 is a detailed block diagram of one sub-system of the visualizing system of FIG. 2.
Figure 10:
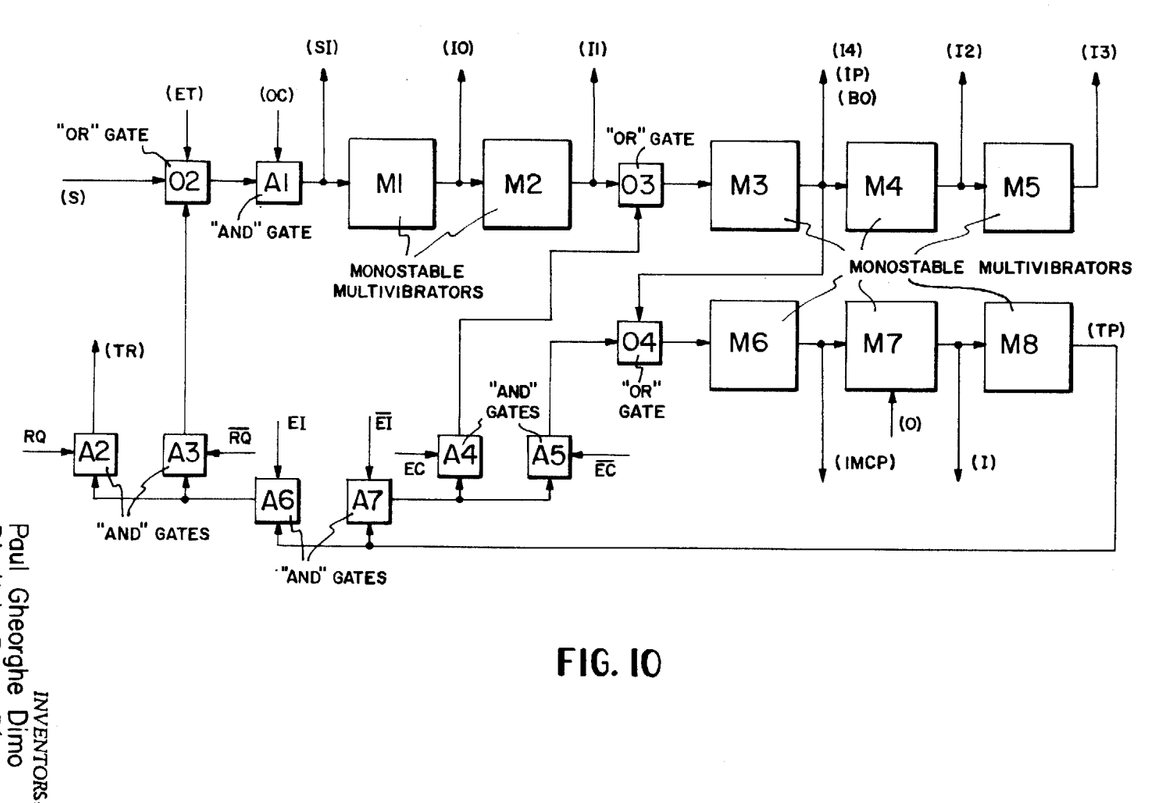
FIG. 10 is a detailed block diagram of a pulse generator for use with the sub-system of FIG. 8.

FIGS. 8 and 10 illustrate the details of a preferred embodiment of the local control system 15 (FIG. 8) and its associated pulse generator (FIG. 10).

FIG. 8 shows the buffer memory 5, hereafter referred to as BM, which receives data TCB from the computer. A buffer memory register BMR is attached to the buffer memory. Through this register, data is transferred between BM and various registers or the main computer. BMR is connected to the ordinate register 7, hereafter referred to as ORG, via the "AND" gates MA1; to the abscissa register 6, hereafter referred to as ARG, via "AND" gates MA2; to the total vector number register TVNR via the "AND" gates MA3; and to the chain vector number register CVNR via the "AND" gates MA4. TVNR is connected to the address counter AC via a digital comparator DC1; in a similar manner, CVNR is connected to the chain counter CC via a digital comparator DC2. The pulse generator of FIG. 10 is connected to BM via an "OR" gate O1, and to AC via an entry $z$ and also via O1 and a time delay T. DC1 is connected to the image flip-flop EIB via its set entry $s$, and DC2 is connected to the end chain flip-flop ECB via its set entry $s$. BM is also connected to the connection between AC and DC1.

FIG. 10 shows the pulse generator mentioned above. As can be seen from the figure, monostable multivibrators M1–M5 are connected in series with each other and with "OR" gates O2 and O3, and with "AND" gate A1. Monostable multivibrators M6–M8, "AND" gates A4, A5 and A7, and "OR" gate O4 are connected in a closed loop with each other. These two chains are connected to each other via a connection between 4A and O3, and a connection between O4 and the output of M3. "AND" gates A2, A3 and A6 are connected to each other in series, and are connected in parallel with the two chains mentioned above via a connection between A3 and O2 and a connection between A6 and A7.

The outputs of M1, M2, M4 and M5 are connected to O1 of the local control system 15 (see FIG. 8). The output of A1 is connected to AC via its entry z. O2, A2 and the request flip-flop RQB (FIG. 8) are connected to the computer; and the operator's condition flip-flop OCB (FIG. 8) is connected to a control panel for manual start and stop of the system. M7 is also connected to the panel. OCB is also connected to O2, and RQB is also connected to A2 and A3. ECB is connected to A4 and A5, and EIB is connected to A6 and A7. The outputs of M3, M6 and M7 are connected to the analog gates and resetting circuits (see FIG. 7). M3 is connected to ECB and to CC through its entry z, and also to the display device 14 (see FIG. 2). M1, M2, M4 and M5 are connected to MA3, MA4, MA2 and MA1 respectively.

The operation of the local control unit 15 of FIG. 8 is now discussed in connection with the circuit diagrams of FIGS. 8 and 10, the pulse diagrams of FIG. 9 and the operation flow chart of FIG. 11.

Figure 3:
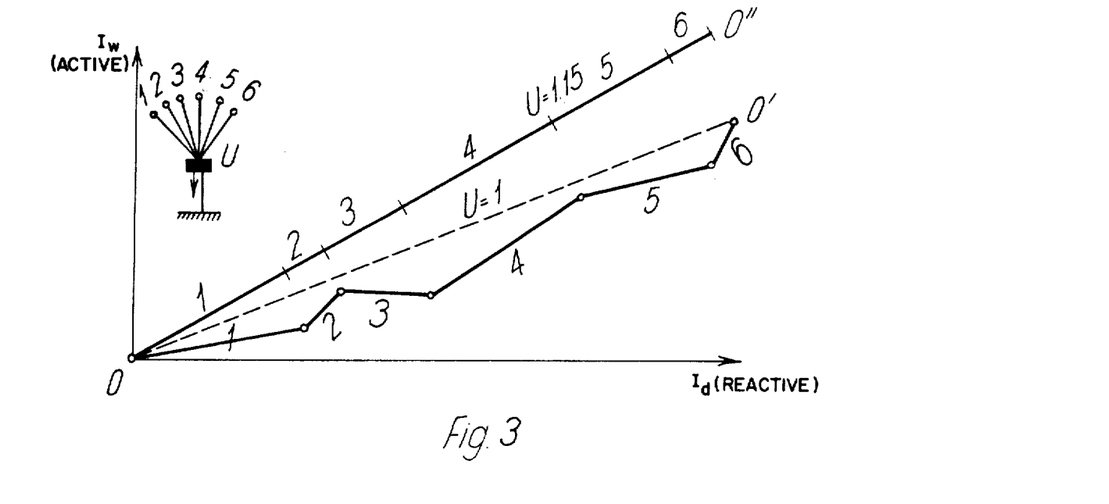
FIG. 3 is a graph showing a REI scheme and the nodal image of a node belonging to a 6-generator system.

FIG. 8 shows the master section of the local control system 15. First the data TCB necessary for the chain of vectors 00' of FIG. 3 is transferred to the buffer memory (BM). The data to be transferred and the order in which data is transferred are as follows:

the total number of the vectors to be plotted (6 in the example of FIG. 3), into address 0 of the buffer memory;
the total number of the vectors in one chain (6 in the example) into address 1 of the buffer;
the value of the abscissa of vector No. 1 into address 2;
the value of the ordinate of vector No. 1 into address 3;
the value of the abscissa of vector No. 2 into address 4;
the value of the ordinate of vector No. 2 into address 5;
and so on, until the value of the ordinate of vector No. 6 enters address 13. This transfer is controlled by appropriate programming of the associated digital computer in a known manner.

An S pulse is fed into the pulse generator shown in FIG. 10 along with an OC pulse from the operator's condition flip-flop OCB (see FIG. 9) causing it to generate an SI pulse. OC is generated by applying a manually generated signal OS from the operator console to the operator's condition flip-flop OCB through its set entry s. When it is desired to stop the system, a manually generated pulse OR is applied to the reset entry r of OCB. This generates a negate pulse $\overline{OC}$.

The SI pulse resets the address counter AC through its reset entry z and the image end flip-flop EIB through its reset entry r. Therefore, the address counter AC will locate address 0. An IO pulse is generated next. This pulse passes through "OR" gate O1 and selects the contents of address 0 in the buffer memory, transfers it through the buffer memory register BMR and "AND" gate MA3 into the total vector number register TVNR, and adds 1 to the content of AC by-passing through the time delay T. Thus, in the example, the contents of TVNR will become 6 while the address counter AC will locate address 1.

An I1 pulse is generated next. This pulse selects from the buffer memory the content of address 1 and transfers it through "AND" gate MA4 into the chain vector number register CVNR. The content of CVNR becomes 6 in the example. One unit is also added to the content of AC.

Figure 9:
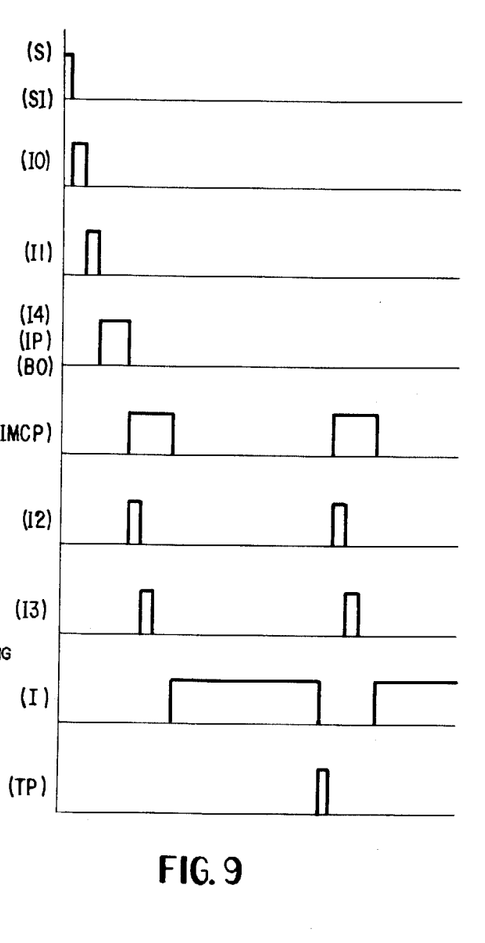
FIG. 9 is a pulse diagram showing the sequence of pulses in the unit of FIG. 10.

Next, IP and blanking (BO) pulses will be generated (see FIGS. 9 and 10). These pulses respectively reset the integrators to their initial conditions and blank the lightspot on the cathode-ray tube screen so that no return line will be observable. An I4 pulse is also generated at this time to reset the chain counter CC through its reset entry z and the end chain flip-flop ECB through its reset entry r.

After the integrators have been reset, an IMCP pulse sets them into their memory state (see FIG. 7).

At the same time, an I2 pulse is generated so that the contents of address 2 enters the abscissa register ARG through the "AND" gates MA2. That is, the abscissa of the first vector has been introduced into the abscissa register. An I3 pulse enters the ordinate value of this same vector into the ordinate register ORG through the "AND" gate MA1. Digital outputs D are then sent from ARG and ORG to the digital-to-analog converters 8 and 9. Integration can now begin.

An I pulse is generated for determining the integration time. It must be of a controllable length in order for the operator to have control over the displayed image dimension. Such control is achieved with devices that are well known in the art.

When integration for one vector is completed, the components of the next vector must enter the ARG and ORG.

Note that each time an I3 pulse is generated a unit is added to the contents of the chain counter CC. A unit is added to the content of AC each time the memory is addressed. The CC thus tracts the number of vectors displayed, while AC is indicating the next address in the buffer.

The plotting of the vectors goes on as described until the digital comparator DC2 emits an EC pulse, meaning that the number of vectors displayed has become equal to the number of vectors in the chain.

In the foregoing example, this happens at the same time to both of the digital comparators DC1 and DC2, that is, after 6 I3 pulses. The image flip-flop EIB and the end chain flip-flop ECB will then be triggered. If during the plotting a request was not registered in the request flip-flop RQB, the SI pulse will be automatically generated again and the whole cycle repeated.

If a request was registered in the request flip-flop RQB by a request pulse RQ from the computer, the SI pulse is blocked and transfer of new data from the computer to the buffer is ordered first. When the transfer has been completed, an ET pulse is generated by the computer and the system starts cycling again with a SI pulse. ET resets the RQB flip-flop through its reset entry r, and enters "AND" gate A1 through "OR" gate O2.

When plotting a "dynamic nodal image" (FIG. 4) the total number of vectors to be drawn differs from the total number of vectors in the chain. Thus, the DC2 comparator senses equality first and the end chain flip-flop ECB is then set into the 1 state through its s entry. A minus cycle is then started, requiring the resetting of the integrators into their initial condition state due to the generation of IP, and the blanking of the lightspot return line due to BO. The resetting of CC is also accomplished due to the I4 pulse before an IMCP pulse and the pulses following it are generated and the next chain can be plotted. The "dynamic nodel image" is completely plotted, even if a request to change data is inserted in the meantime. The transfer of data from the computer to the buffer can take place only after the image pulse EI has been generated by DC1 and the EIB flip-flop has been triggered.

A test pulse TP can also be generated to test if any of the ECB, RQB and EIB flip-flops were triggered during the integration that has just taken place.

A pulse generator for producing the necessary sequence and achieving the correct switching of the pulses is described now, in connection with FIG. 10.

The locations of all pulses defined in connection with FIG. 9 are shown in FIG. 10. As can be seen from FIG. 10, the generation of either an S or an ET signal through "OR" gate O2 and an OC signal from the OCB flip-flop will close and "AND" gate A1 and generate pulse SI. Simultaneously with the generation of pulse SI, the monostable multivibrator M1 is triggered so that pulse IO is generated. Pulse IO in turn triggers the monostable multivibrator M2, which generates pulse I1. This procedure is repeated through "OR" gate O3, monostable multivibrators M3, M4 and M5 and pulses I4, IP, BO, I2 and I3.

Simultaneously with the generation of pulse I4, the monostable multivibrator M6 is triggered by means of a signal through "OR" gate O4 so that pulse IMCP is generated. The generation of pulse IMCP, along with the operator pulse O triggers the monostable multivibrator M7 to generate pulse I. The generation of pulse I triggers the monostable multivibrator M8 so that the test pulse TP is generated.

Test pulse TP enters the "AND" gates A6 and A7. When pulses EI and the negated output of the EIB flip-flop $\overline{EI}$ also enter the "AND" gates A6 and A7 respectively, signals are emitted which enter "AND" gates A2 through A5. When a pulse RQ from the RQB flip-flop enters gate A2, a TR pulse is emitted. When the negated output pulse of the RQB flip-flop $\overline{RQ}$ enters the A3 gate, a pulse is sent to gate O2 to recycle the system. An EC pulse triggers gate A4 and sends a signal to gate O3 to recycle that portion of the system; and an $\overline{EC}$ pulse into gate A5 will send a signal to gate O4 to recycle that portion of the system.

The TR pulse is generated when a request has occurred and it orders the computer to start the transfer of data.

A summary of the systems operation under various conditions is presented in the form of a flow-chart in FIG. 11.

The image plotting apparatus discussed above may be used for displaying nodal images for any of an electric power system's nodes. These may or may not be in real-time, depending upon the computer's mode of operation. FIGS. 3 and 4 each show examples of these images.

The nodal image represented in FIG. 3 corresponds to a REI network in which 6 generating nodes were retained. Two different states of the nodes are viewed, the chain with colinear vectors corresponding to the maximum nodal voltage. The relative importance of each of the generators may be seen by the contribution of the respective vectors to the total short-circuit current, which is made up of the sum of all the vectors. FIG. 3 shows, for instance, the maximum effect on over voltaging the node under study in case the rotors of the 6 generators are rendered dynamic. The voltage, in the case given in the example, is 1.15 if the initial voltage is taken as 1.

In FIG. 4 a "dynamic nodal image" is shown. It consists of divergent chains of vectors; each chain representing the state of the node at a given time. One sees the relative importance of the generators kept in the study in their evolution during the dynamic state. The image is easily interpreted by a skilled operator. Starting, for example, from the initial state of a node after a short-circuit occurring in any point of the network, the evolution of the nodal image is shown at 0.2 second, 0.25 second, and 0.3 second. In the example of FIG. 4, the short-circuit is over after 0.3 second and this accounts for 4 images.

The whole dynamic process is viewed from the node under consideration. Thus, from this node it is seen that the generator 4 is unstable, but its effect on the node in study is small. At the same time, generators 1 and 5 are very important in forming the electrical magnitudes of the node under consideration. This can be seen from their contribution to the total vector.

Such images can be obtained on a cathode-ray tube, an x–y graphic plotter, or in some other way, before, during and after the defect has been eliminated, or after some other circuit alteration. The operator can preserve a desired image as well as the complete data referring to the respective regime by photographing such images.

Figure 5:
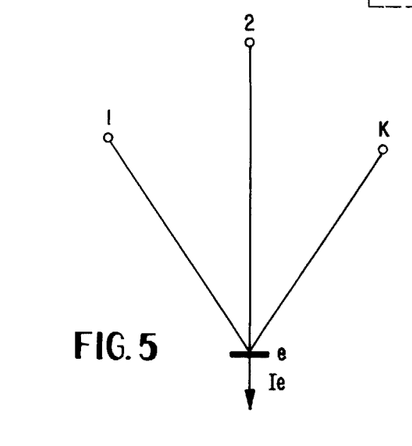
FIG. 5 is a graph showing a "REI single-load (e) system" equivalent for a simple 3-generator system.

FIG. 5 shows an example of a single load REI equivalent, indicated as $e$, for a system reduced to 3 generators. There exists a parasite circulation (not shown) between nodes 1, 2 and K that has no use in the load supply.

FIG. 6 shows the "nodal image" of the pseudo-node $O_n$ of the single-load for the 3 generator power system of FIG. 5. It is to be noticed that generator 1, represented by the vector $I_e$ is the first vector from the "pseudo-single load," and it is likely that it may be the cause of some considerable power losses. The case is reversed for the generator K.

It will be understood that the above description of the present invention is susceptible to various modifications, changes and adaptations, and the same are intended to be comprehended within the meaning and range of equivalents of the appended claims.

What is claimed is:

1. In a data processing system for the direct analysis of the operation of an electrical power network, which system includes a digital computer, the improvement wherein said data processing system includes means responsive to the digital data supplied by said digital computer and constituting an apparatus which is a specialized piece of peripheral equipment for said digital computer for providing a display of chains of a predetermined number of vectors which chains represent the nodal image of a selected node in the network, whereby direct analysis of the operation of the network can be carried out by visual inspection of said displayed nodal image, said means for providing a display comprising in combination: a buffer memory connected to the output of said computer and storing all of the digital data required for producing the said display; two coordinate registers connected to said buffer memory, said coordinated registers receiving and storing in succession the digital values of the respective coordinates of each vector of each chain; two digital to analog converters each connected to a respective one of said registers, and generating voltages proportional to the digital values of the vector coordinates; a display generating system generating said nodal image and including an x–y plotting device having a display area and a writing means, and means for controlling the movement of said writing means across said writing area of said x–y plotting device to trace in sequence the lines representing each vector of a chain; said means for controlling the movement of said writing means including first and second analog gates each having an input connected to the output of a respective one of said two digital to analog converters and first and second integrators each having its input connected to the output of a respective one of said analog gates and its output connected to the respective x and y deflection systems of said x–y plotting device; and a local control system effecting automatic operation of said apparatus, said local control system including means for resetting said integrators to their initial condition only at the end of a vector chain.

2. Apparatus defined in claim 1 wherein said x–y plotting device is a cathode-ray tube.

3. Apparatus as defined in claim 2 wherein said control system comprises: means for selecting out from said buffer memory the digital values of the coordinates of the vectors to be displayed, means for providing image stability through cyclic display of the same image and means for processing operator's and computer's requests, said control system including: a pulse generator generating and distributing the required sequence of pulses; a first register storing a digital value corresponding to the number of vectors in a given chain; a first counter, connected to said pulse generator, counting the number of vectors forming part of such chain, which vectors have been already traced on the screen of the said cathode-ray tube; a first digital comparator, connected to said first register and said first counter, providing a comparison between the number of vectors to be displayed and the number of vectors thus far counted, and generating a pulse when equality is reached; a second register storing the value associated to the total number of vectors to be displayed in the total image; a second counter, connected to said pulse generator, counting the number of the vectors already traced on the screen of the said cathode-ray tube; a second digital comparator, connected to said second register and said second counter, providing a comparison between the number of vectors to be displayed and the number of vectors thus far counted, and generating a pulse when equality is reached; means, including four flip-flops and first and second logic means, connected to said counters, said registers and said pulse generator for controlling the state of said counters, said registers and said pulse generator as a function of internal and external requirements, a first of said flip-flops being responsive to the output of said first digital comparator, a second of said flip-flops being responsive to the output of said second digital comparator, and the third and fourth of said flip-flops being responsive to external control signals from said computer and from an operator, respectively; said first logic means being connected to said pulse generator and responsive to the outputs of said flip-flops for controlling the sequence in which generator pulses are switched, and said second logic means being responsive to the output signals from said pulse generator for controlling the movement of digital information between said buffer memory and said registers, and for controlling the digital state of said counters.

4. Apparatus as defined in claim 1 further comprising additional means and increasing the efficiency with which the analysis can be effected, said additional means comprising a functional keyboard and a typewriter connected to said computer for exchanging information therewith; and photographic apparatus arranged to obtain a permanent record of the displayed nodal images.

5. Apparatus as defined in claim 1 wherein said $x-y$ plotting device is an $x-y$ graphic plotter.

References Cited

UNITED STATES PATENTS

| | | | |
|---|---|---|---|
| 3,430,207 | 2/1969 | Davis | 340—172.5 |
| 3,438,003 | 4/1969 | Bryan | 340—172.5 |
| 3,411,140 | 11/1968 | Halina et al. | 340—172.5 |
| 3,067,407 | 12/1962 | Schaaf | 340—172.5 X |
| 3,348,229 | 10/1967 | Freas | 340—172.5 X |
| 3,394,352 | 7/1968 | Wernikoff et al. | 340—172.5 |
| 3,500,332 | 3/1970 | Vosbury | 340—172.5 |
| 3,320,409 | 5/1967 | Larrowe | 235—151 |

OTHER REFERENCES

"Computer Control of Power Systems," Oct. 2, 1964 from The Engineer, 218 (5671); pp. 535–536.

HARVEY E. SPRINGBORN, Primary Examiner